United States Patent
Zauritz et al.

(10) Patent No.: US 7,862,076 B2
(45) Date of Patent: Jan. 4, 2011

(54) AIRBAG FOR INSTALLATION IN A MOTOR VEHICLE

(75) Inventors: Ralf Zauritz, Holzkirchen (DE); Stefan Hauser, Haimhausen (DE)

(73) Assignee: Autoliv Development AB, Vargarda (SE)

( * ) Notice: Subject to any disclaimer, the term of this patent is extended or adjusted under 35 U.S.C. 154(b) by 328 days.

(21) Appl. No.: 10/588,528

(22) PCT Filed: Feb. 4, 2005

(86) PCT No.: PCT/EP2005/001108
§ 371 (c)(1),
(2), (4) Date: May 26, 2007

(87) PCT Pub. No.: WO2006/050757
PCT Pub. Date: May 18, 2006

(65) Prior Publication Data
US 2008/0023945 A1   Jan. 31, 2008

(30) Foreign Application Priority Data
Feb. 6, 2004   (DE) .................. 10 2004 006 185

(51) Int. Cl.
*B60R 21/276* (2006.01)
(52) U.S. Cl. .................. 280/730.2; 280/729; 280/742
(58) Field of Classification Search .............. 280/730.2, 280/729, 728.1, 742
See application file for complete search history.

(56) References Cited

U.S. PATENT DOCUMENTS

| 5,791,685 | A | * | 8/1998 | Lachat et al. | ............ | 280/743.1 |
|---|---|---|---|---|---|---|
| 5,853,191 | A | * | 12/1998 | Lachat | ............ | 280/730.2 |
| 6,059,312 | A | * | 5/2000 | Staub et al. | ............ | 280/729 |
| 6,511,093 | B2 | * | 1/2003 | Buerkle et al. | ............ | 280/729 |
| 6,540,253 | B2 | * | 4/2003 | Acker et al. | ............ | 280/730.2 |
| 6,783,151 | B2 | | 8/2004 | Rasch et al. | | |
| 6,802,529 | B2 | * | 10/2004 | Takedomi et al. | ............ | 280/729 |
| 7,264,269 | B2 | * | 9/2007 | Gu et al. | ............ | 280/730.2 |
| 7,475,904 | B2 | * | 1/2009 | Hofmann et al. | ............ | 280/739 |
| 2004/0124615 | A1 | * | 7/2004 | Tanase et al. | ............ | 280/730.2 |
| 2007/0057492 | A1 | * | 3/2007 | Feller et al. | ............ | 280/730.2 |

FOREIGN PATENT DOCUMENTS

| DE | 19714266 A1 | 11/1997 |
|---|---|---|
| DE | 10018170 A1 | 10/2001 |
| EP | 1338480 A2 | 8/2003 |
| EP | 1044855 B1 | 12/2003 |
| JP | 2002-79905 A | 3/2002 |

* cited by examiner

*Primary Examiner*—Paul N Dickson
*Assistant Examiner*—Timothy D Wilhelm
(74) *Attorney, Agent, or Firm*—Brinks Hofer Gilson & Lione

(57) ABSTRACT

In order to achieve improved protection of the occupants of a motor vehicle, a side airbag is proposed which, when necessary, provides different hardnesses depending on the size of the vehicle occupant. The airbag includes at least one main chamber and at least one auxiliary chamber. The main chamber and auxiliary chamber are connected with each other via a connecting opening. Furthermore, an outflow opening is present from which gas can flow out of the airbag. The outflow opening is included in the auxiliary chamber. A closing element is provided which, when the auxiliary chamber meets an obstacle during or after expansion of the airbag, blocks or throttles the gas flow through the outflow opening.

12 Claims, 4 Drawing Sheets

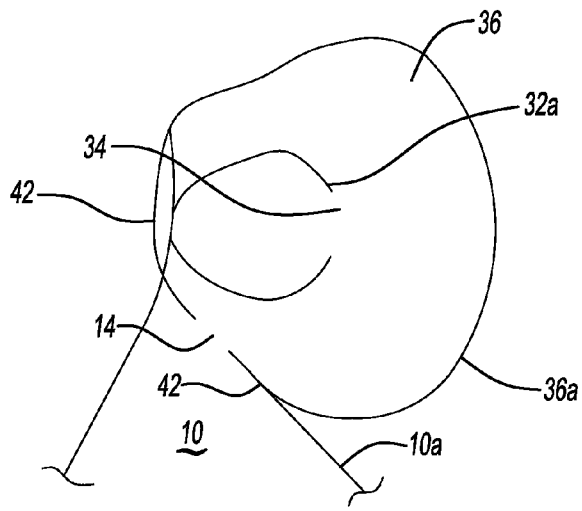
*Fig-3*
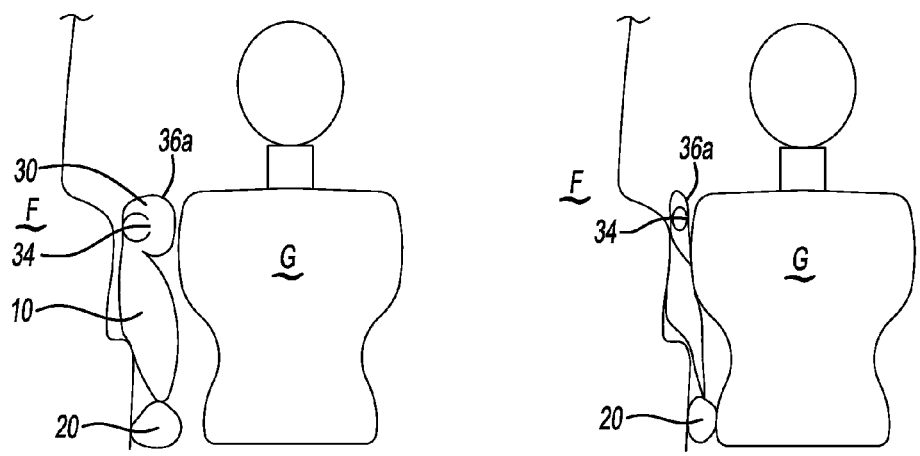
*Fig-4*  *Fig-5*
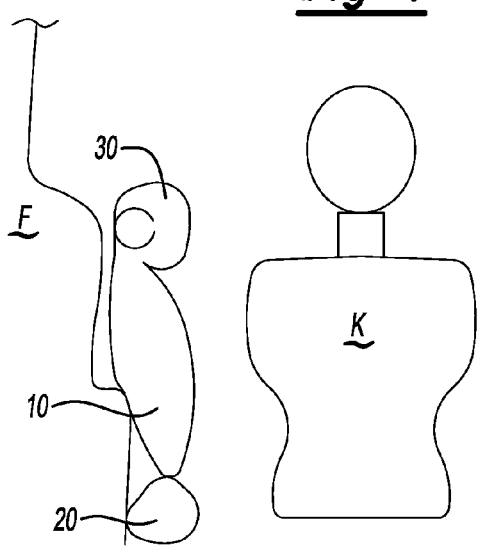  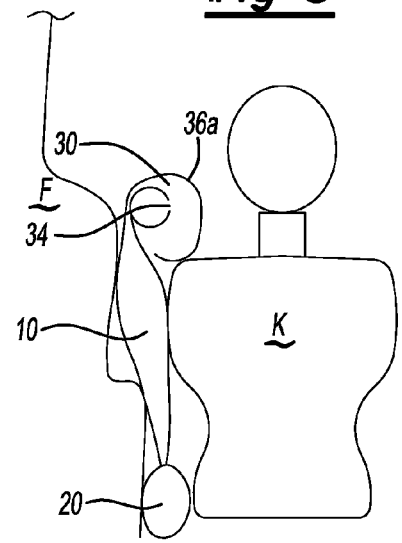
*Fig-6*  *Fig-7*

AIRBAG FOR INSTALLATION IN A MOTOR VEHICLE

CROSS REFERENCE TO RELATED APPLICATIONS

This application claims priority to German patent application 102004006185.8, filed Feb. 6, 2004 and PCT/EP2005/001108, filed Feb. 4, 2005.

BACKGROUND

1. Field of the Invention

The invention relates to an airbag for installation in a motor vehicle.

2. Description of Related Art

Traditionally, airbags are provided with one or several outflow openings and are filled by means of a gas generator unit with a specified performance profile. Because of the geometry of the airbag, the performance profile of the gas generator unit, the cross-section of the outflow opening or openings, and the internal pressure of the airbag a certain firmness results when it is inflated.

Ideally, the hardness of an airbag, in particular the firmness of an airbag used in a side airbag system, should be adapted to the body weight of the vehicle occupants. A relatively light occupant requires an airbag with less firmness, in other words with lower internal pressure, so that the force exerted by the airbag is as low as possible when the relevant part of the body, for example the upper part of the torso (i.e. thorax), strikes the airbag. Heavier vehicle occupants, on the other hand, require an airbag with greater internal pressure, otherwise the overall retaining pressure for the occupant may be too low and there is a risk that the occupant will strike the structure of the vehicle despite the presence of the airbag.

It is generally not possible to design each airbag in a vehicle to accord with the requirements of the specific occupants to be protected, as a vehicle is generally used by several people. It would therefore be desirable to have an airbag which "recognizes" if it has to protect a light or a heavy occupant and which is configured to provide different hardnesses as required.

In addition, a similar problem to the one described above also arises in the case of so-called "out of position occupants". Airbags are generally designed in such a way that they protect vehicle occupants who are in a "normal" seating position. If the occupant is in an atypical seating position, he or she may find his or herself in the direction of expansion of the airbag, resulting in a possibility of injury. U.S. Pat. No. 6,783,151 proposes an airbag which accommodates an occupant positioned in the direction of expansion of the airbag, and limits the expansion of the airbag in response. Multiple embodiments of U.S. Pat. No. 6,783,151 accommodates an out of position occupant.

In a first embodiment, the airbag includes two chambers, which are connected with each other by a valve arrangement. This valve arrangement is designed and implemented in such a way that the valve remains closed or restricted if the airbag strikes an obstacle during expansion. In this case, only one chamber of the airbag is filled, so that the direction of expansion is shortened.

In another embodiment, the outer cover of the airbag includes a valve which is only closed if the airbag does not meet an obstacle. If the airbag does meet an obstacle, the valve remains open, keeping the expansion and pressure in the airbag low.

The airbag embodiments proposed in U.S. Pat. No. 6,783,151 serve to limit the expansion of the airbag in the presence of an obstacle. The type of obstacle, for example, whether the vehicle occupant is large and heavy or small and light, does not play a role. Such factors are also not necessary in order to solve the task of the present invention.

The task of the present invention is to create an airbag which provides a different firmness depending on certain physical characteristics of the vehicle occupants.

SUMMARY

In satisfying the above need, as well as overcoming the drawbacks and other limitations of the related art, the present invention provides a side airbag capable of accommodating and responding to vehicle occupants of differing weights. The physical size of the vehicle occupant is selected as a criterion for the different inflation states of the side airbag, since size is generally closely related to the weight of the occupant and can be more easily accommodated by the airbag without external sensors.

The side airbag of the present invention includes at least one main chamber and at least one auxiliary chamber, whereby these chambers are connected with each other by a connecting opening. The auxiliary chamber includes an outflow opening through which gas from a gas generator exits. A closing element is included with the outflow opening to block the flow of gas to the outflow opening, wholly or in part, when the auxiliary chamber meets an obstacle during or after expansion of the airbag.

In addition, the side airbag is dimensioned and arranged in such a way that the main chamber and is, in the case of a large occupant, located at the upper chest of the large occupant. In the case of a small occupant, the main chamber is located above the shoulders. If the large occupant meets such an airbag, the outflow opening is blocked, which means that the pressure in the main chamber is increased accordingly. However, in the case of the small occupant, the outflow opening remains linked to the main chamber, allowing gas to flow out of the main chamber, reducing the pressure in the main chamber, and resulting in a softer airbag.

In a preferred embodiment of the present invention, the auxiliary chamber includes an inner and an outer chamber. The outer chamber is connected with the main chamber and the auxiliary chamber by a valve opening which connects the outer chamber with the outflow opening associated with the inner chamber. If the auxiliary chamber encounters an obstacle, a part of a fabric layer of the outer chamber is pressed onto the valve opening, and the gas path between the main chamber and the outflow opening is interrupted.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 3 is a detail view of an upper portion of the airbag of FIG. 2;

FIG. 4 is a front view of the airbag of FIG. 1 inflating beside a large vehicle occupant just prior to contact with the large vehicle occupant;

FIG. 5 is a front view of the airbag of FIG. 4 after contact with the large vehicle occupant;

FIG. 6 is a front view of the airbag of FIG. 1 inflating beside a small vehicle occupant just prior to contact with the small vehicle occupant;

FIG. 7 is a front view of the airbag of FIG. 6 after contact with the small vehicle occupant;

DETAILED DESCRIPTION

Figure 1:
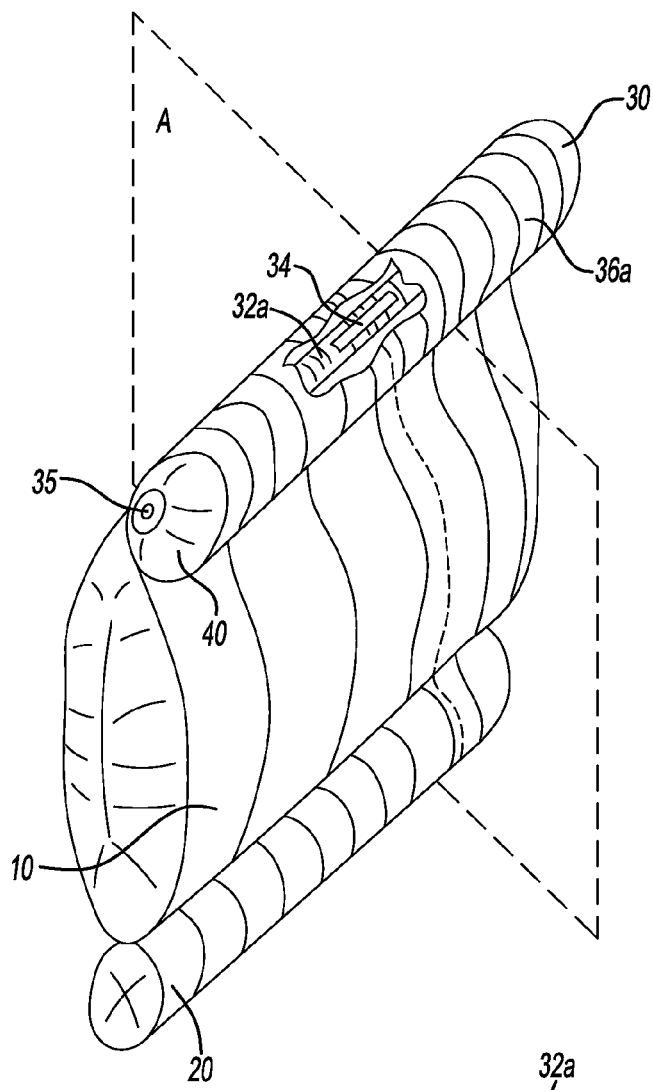
FIG. 1 is a perspective view of an airbag according to the principles of the present invention.

Referring now to the drawings, an airbag embodying the principles of the present invention is illustrated in FIG. 1. The structure of the airbag according to a first embodiment in the form of a side airbag is now described with reference to FIGS. 1 to 3. As its primary components, the airbag includes three chambers, namely the main chamber 10, the pelvic chamber 20 and the auxiliary chamber 30 (see FIG. 1). The main chamber 10 and the pelvic chamber 20 serve to restrain a vehicle occupant, while the auxiliary chamber 30 primarily serves to regulate pressure within the main chamber 10. The main chamber 10 is generally arranged, upon inflation, adjacent to an upper body (i.e. thorax) area of a vehicle occupant (see FIGS. 4-7). Likewise, the pelvic chamber 20 is arranged adjacent to a pelvic area of a vehicle occupant.

Figure 2:
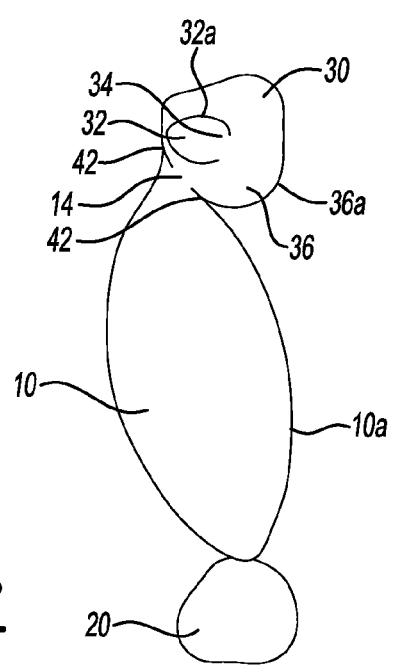
FIG. 2 is a section view of the airbag of FIG. 1 along Plane A.

As can best be seen from FIGS. 2 and 3, the auxiliary chamber 30 is sewn onto the main chamber 10 by means of seam areas 42. Furthermore, the main chamber 10 and the auxiliary chamber 30 are connected with each other by means of a connecting opening 14, so that exchange of gas can take place between the main chamber 10 and the auxiliary chamber 30.

Auxiliary chamber 30 is again itself formed in two pieces, of an inner chamber 32 with an inner fabric layer 32a and an outer chamber 36 with an outer fabric layer 36a (see FIG. 3). The aforementioned connecting opening 14 is a common opening between a fabric layer 10a of the main chamber 10 and the outer fabric layer 36a of the auxiliary chamber 30.

The inner chamber 32 and the outer chamber 36 are each basically tubular in form as can best be seen in FIG. 1. In this view, the outer fabric layer 36a is shown broken open in a certain area, so that the inner chamber 32 is visible. Inner chamber 32 and outer chamber 36 include a common front side 40 in which an outflow opening 35 is located, which connects the interior of the inner chamber 32 with the environment outside of the airbag.

A valve opening 34 is located in the inner fabric layer 32a, which connects the inner chamber 32 with the outer chamber 36 (see FIGS. 1 to 3). If the airbag can expand unhindered (this corresponds to the situation shown in FIGS. 1 to 3), the main chamber 10 is connected with the outside environment (i.e. gas can flow out of the main chamber into the environment). In this situation, a gas path is as follows: gas first flows from main chamber 10 through connecting opening 14 into outer chamber 36, from there through valve opening 34 into inner chamber 32 and from there through outflow opening 35 to the outside. Depending on the configuration of a gas generator (not shown) and the geometry of the airbag, a certain internal pressure is created in the main chamber 10.

The valve opening 34 and the connecting opening 14 can be in the form of holes in the respective fabric layers or gas-permeable fabric areas.

If a part of the outer fabric layer 36a is pressed against the valve opening 34, the valve opening 34 is completely or partly closed and the flow of gas from the main chamber 10 to the outside is throttled or completely blocked, and a higher internal pressure is created in the main chamber 10 with a given gas generator. Therefore a section of the outer fabric layer 36a serves in this embodiment as a closing element, to block or throttle the gas flow.

The mode of functioning of an airbag according to the present invention, when installed in a motor vehicle, is described with reference to FIGS. 4 to 7, whereby the inside of the vehicle is designated with reference letter F.

FIG. 4 shows the airbag inflating next to a large vehicle occupant G during a side-on collision. If relative movement occurs between the large occupant G and the airbag, the shoulder area of the large occupant G comes into contact with the auxiliary chamber 30 (see FIG. 5). This results in the outer fabric layer 36a (see FIG. 4) covering the valve opening 34, which stems the gas flow from the main chamber 10. This leads to a large internal pressure and therefore to a greater firmness of the main chamber 10, which is sufficient to protect an upper body or thorax area of the large, and generally heavy, occupant G.

FIGS. 6 and 7 show a situation similar to that described above except with a small occupant K. Here too, in the case of a side-on collision a relative movement occurs between the small occupant K and the airbag. However, the shoulder area is located under the auxiliary chamber 30, so that the outer fabric layer 36a is not pressed against the valve opening 34. This results in the gas path from the main chamber 10 to the outflow opening 35 remaining free, resulting in a lower pressure in the main chamber 10.

Figure 8:
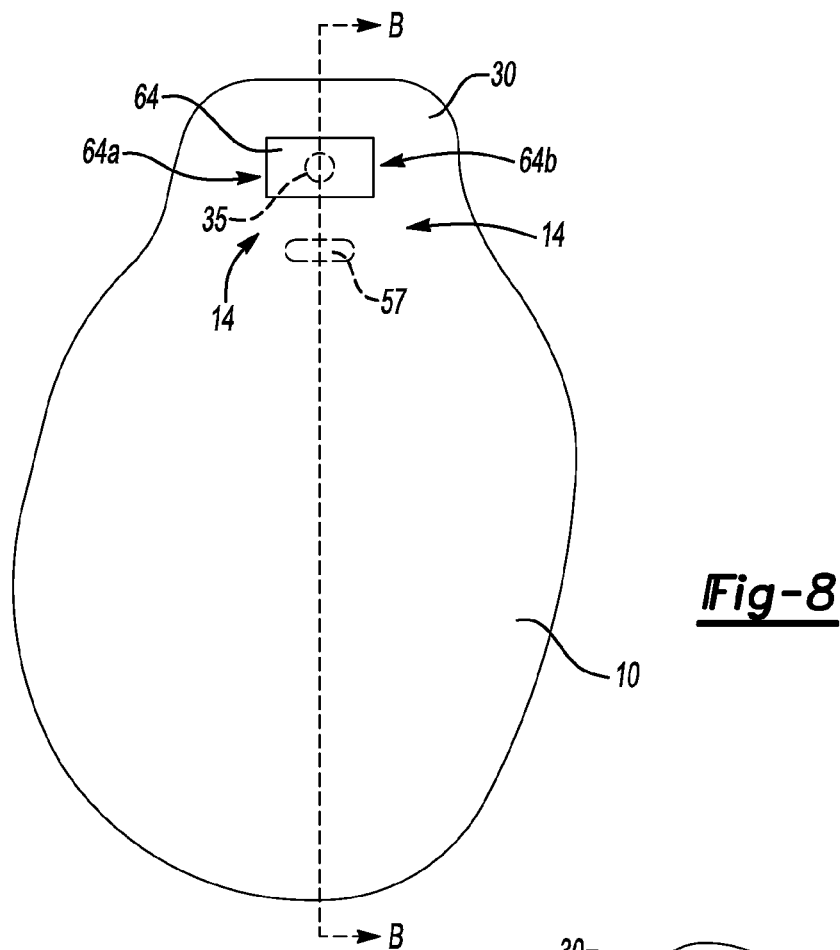
FIG. 8 is a side view of a second embodiment of the airbag according to the principles of the present invention.
Figure 9:
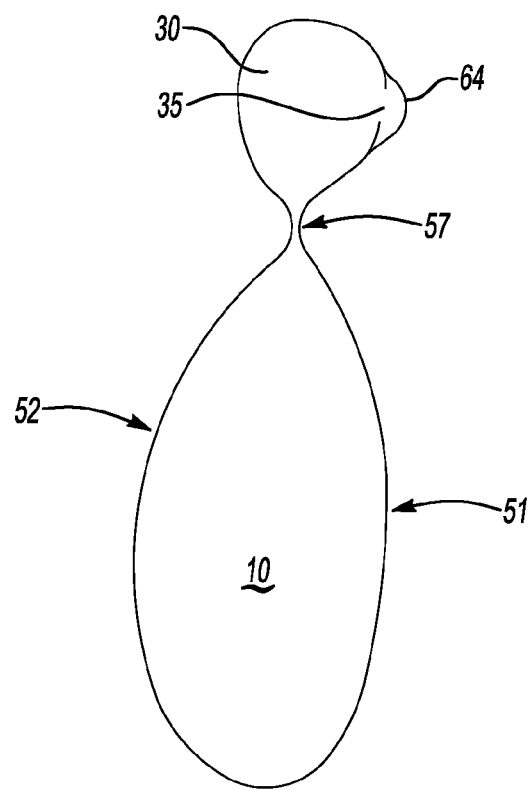
FIG. 9 is a section view along line B-B of the airbag of FIG. 8.

FIG. 8 shows a second embodiment in a side view. This embodiment includes a main chamber 10 and an auxiliary chamber 30, but no pelvic chamber 20; such a chamber can, however, be present as an option in an airbag implemented in this way. The main chamber 10 and auxiliary chamber 30 are formed by the outer fabric layers 51 and 52 being sewn together around their perimeter and in the transitional area between the main chamber 10 and the auxiliary chamber 30 at a connecting area 57 (see FIG. 9). This results in two connecting openings 14 being formed, respectively located on the left and right of the connecting area 57.

The outflow opening 35 which is located in the first outer fabric layer 51 is covered by a covering fabric 64 whose first and second sides 64a and 64b are not fastened to the first outer fabric layer 51, so that gas coming from the outflow opening 35 can enter the interior of the vehicle. If the auxiliary chamber 30 is pressed onto the inner structure of the motor vehicle, for example by the shoulder of the occupant, the outflow opening 35 is closed by the covering fabric 64 contacting the inner structure, stopping the gas flow. The covering fabric therefore forms the closing element. The basic functional principle is therefore identical with that of the first embodiment.

Figure 10:
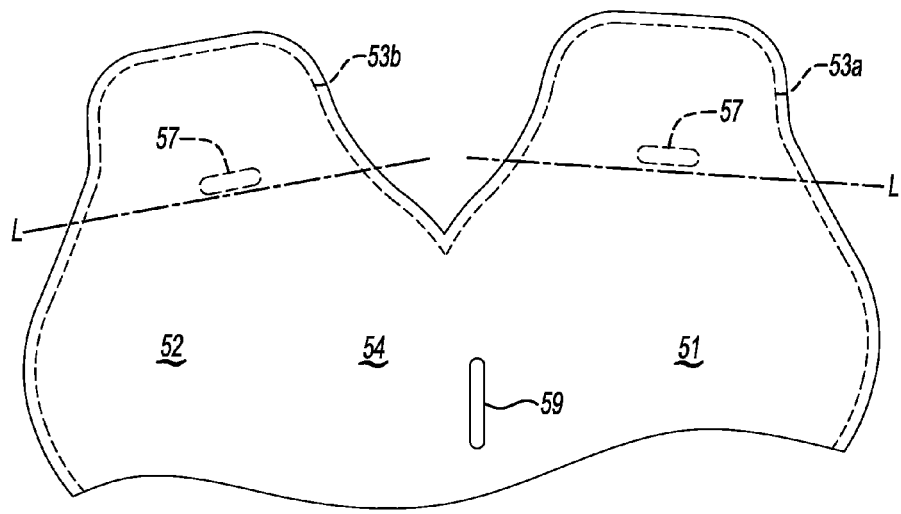
FIG. 10 is an outer unstitched fabric for the two outer fabric layers of an airbag according to a third embodiment of the present invention.
Figure 11:
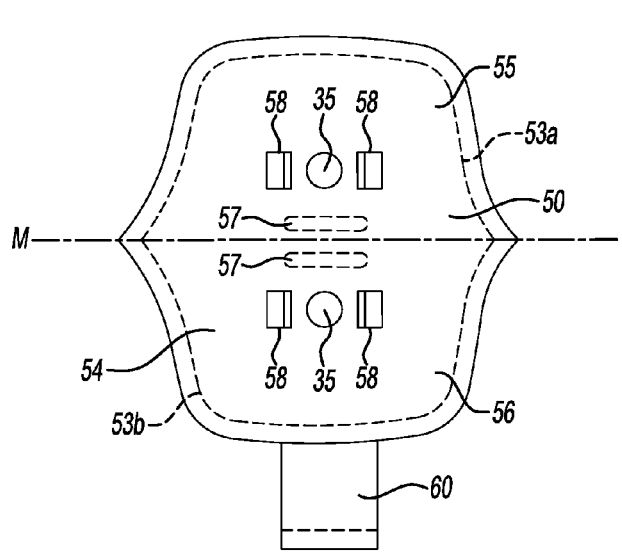
FIG. 11 is an inner unstitched fabric for the two inner fabric layers of the airbag of FIG. 10.
Figure 12:
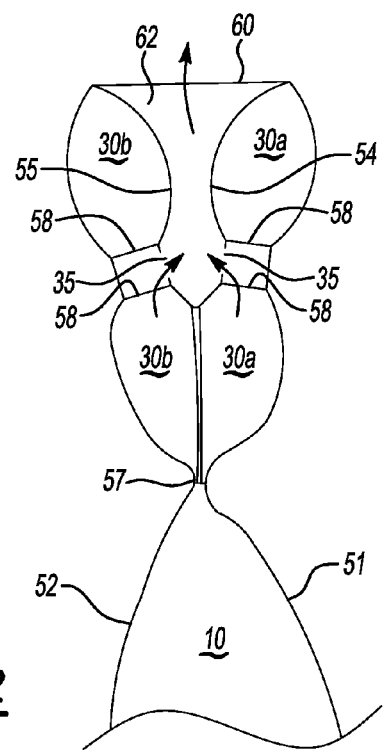
FIG. 12 is a section view of the airbag of FIG. 10.

FIGS. 10 to 12 show a variant of the second embodiment described above. The difference is that two auxiliary chambers 30a and 30b are provided (see FIG. 12). Because of the special arrangement of the two auxiliary chambers 30a and 30b, desirable outflow behaviour can be achieved resulting in an improved means for closing the outflow openings is also implemented.

The cover of the airbag is manufactured of only two fabric sections. FIG. 10 shows a first fabric section 54, from which a first outer fabric layer 51 and a second outer fabric layer 52 are created. Between these layers, the main chamber 10 is created beneath a broken line L, while the auxiliary chambers 30a and 30b are created above the broken line L (see FIG. 12). This variant also includes a connecting area 57. A gas generator opening 59 is provided in the first fabric section 54 in the transitional area between the first outer fabric layer 51 and the second outer fabric layer 52.

FIG. 11 shows a second fabric section 50, from which a first inner fabric layer 55 and a second inner fabric layer 56 are formed. In addition, an outer capture tether 60 is located on the second fabric section 50. The two outflow openings 35 are located in the second fabric section 50 as well as four inner capture tethers 58, which are connected to the first outer fabric layer 51 or the second outer fabric layer 52 during the manufacturing process.

The two fabric sections 50 and 54 are sewn together as described in the following text. The second fabric section 50 is folded over along a mid line M and then the first inner fabric layer 55 is sewn together with the first outer fabric layer 51 along the first seam 53a and the second inner fabric layer 56 is sewn together with the second outer fabric layer 52 along the second seam 53b. Furthermore, the inner capture tethers 58 are joined with the second fabric section 50 and sewn together to respective opposite areas of the outer fabric layers 51 and 52. Finally, all four fabric layers are joined together in connecting area 57 by means of sewing. As a last step, the top edges of the auxiliary chambers 30a and 30b are joined together by means of outer capture tether 60. This results in the configuration shown in FIG. 12, which is a section of the present embodiment similar to the representation of FIG. 9 and which shows the situation when the airbag is fully expanded.

All four fabric layers are sewn together in the connecting area 57. Below this connecting area 57 is the main chamber 10, above the connecting area 57 are the two auxiliary chambers 30a and 30b. The thickness of the two auxiliary chambers is limited by the two capture tethers 58 respectively. The gas flow from the main chamber 10 into the auxiliary chambers 30a and 30b occurs to the left and right of the connecting area 57 (this cannot be seen from the representation in FIG. 12). The two auxiliary chambers 30a and 30b are connected with each other at their upper ends by means of the outer capture tether 60, so that an intermediate area 62, which is basically open to the top and sides, is created between the two auxiliary chambers 30a and 30b. The two outflow openings 35 end in this intermediate area 62, so that direct gas flow onto the vehicle occupant or the side structure of the vehicle is avoided. Outflow openings 35 are closed if the two auxiliary chambers 30a and 30b are pressed onto one another by an external obstacle, for example the shoulder of the occupant. This means the one auxiliary chamber 30a and 30b forms the closing element of the other auxiliary chambers 30a or 30b.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. A side impact airbag for installation in a motor vehicle which is capable of responding differently to a large and a small motor vehicle occupant striking the airbag in a side-on collision, the airbag comprising: at least one chamber; wherein the chamber includes an outflow opening and a closing element that is configured to block or throttle the flow of an inflation gas filing the chamber through the outflow opening and out of the chamber, the airbag and closing element located within the motor vehicle such that in the side-on collision, the closing element is not engaged by the small occupant contacting the airbag and is engaged by the larger occupant contacting the airbag, wherein when the closing element is not engaged gas flow through the outflow opening is enabled to reduce gas pressure in the chamber, and when the closing element is engaged the gas flow through the outflow opening is restricted, wherein the airbag forms a main chamber arranged to be adjacent to a thorax area of the vehicle occupant, and the chamber is in the form of an auxiliary chamber positioned on top of the main chamber, and wherein the outflow opening is formed by the auxiliary chamber, the main chamber has a lower outer impact surface for being directly impacted by the thorax area of the vehicle occupant, and the auxiliary chamber has an upper outer surface for being directly impacted by the thorax area of the larger occupant to engage the closing element and for not being directly impacted by the thorax area of the smaller occupant to not engage the closing element.

2. An airbag according to claim 1, wherein a pelvic chamber is located on the bottom of the main chamber, adjacent to a pelvic area of a vehicle occupant.

3. An airbag according to claim 1, wherein the auxiliary chamber includes an inner chamber with an inner fabric layer and an outer chamber with an outer fabric layer;
the outer fabric layer being connected in sections with a fabric of the main chamber and the connecting opening being located between an outer fabric layer and the fabric of the main chamber;
the inner fabric layer includes a valve opening, through which the gas flow can stream from the outer chamber into the inner chamber and from there to the outflow opening.

4. An airbag according to claim 3 wherein a section of the outer fabric layer is configured as a closing element for the valve opening.

5. An airbag according to claim 3 wherein the inner and outer fabric layers of the auxiliary chambers are basically tubular in shape.

6. An airbag according to claim 1 wherein the closing element is formed by a covering fabric.

7. An airbag according to claim 1 further comprising the airbag having two auxiliary chambers.

8. A side impact airbag for installation in a motor vehicle comprising: at least one main chamber and two auxiliary chambers, whereby the main chamber and the auxiliary chambers are connected with each other by means of a connecting opening;
wherein the auxiliary chambers include an outflow opening and a closing element is configured to block or throttle a gas flow through the outflow opening if at least one of the auxiliary chambers meets an obstacle during expansion of the airbag, each of the two auxiliary chambers including at least two inner fabric layers and the at least two inner fabric layers which lie opposite one another such that when the airbag is fully expanded, an open intermediate layer is present between the two inner fabric layers.

9. An airbag according to claim 8 wherein the two auxiliary chambers are connected with each other by an outer tether.

10. An airbag according to claim 8 wherein the outflow openings of the two auxiliary chambers end in an intermediate area.

11. An airbag according to claim 8 further comprising an exterior cover of the airbag being manufactured of two fabric sections.

12. An airbag according to claim 8 further comprising two outer and two inner fabric layers wherein all four fabric layers are joined to each other in a connection area.

* * * * *